Patented May 20, 1952

2,597,117

UNITED STATES PATENT OFFICE 2,597,117

AQUEOUS ELECTROLYTE FOR PRIMARY GALVANIC CELL

Erwin A. Schumacher, Parma, and Paul S. Brooks, Lakewood, Ohio, assignors, by mesne assignments, to Union Carbide and Carbon Corporation, a corporation of New York No Drawing. Application December 28, 1948, Serial No. 67,758

11 Claims. (Cl. 136—154)

This invention relates to an aqueous electrolyte for a primary galvanic cell and refers more particularly to an electrolyte for an air depolarized cell of the carbon-alkali-zinc type.

Certain electronic devices presently coming into rather widespread use require a source of electricity for the "A" circuit which will supply a relatively uniform voltage for long periods of time. A typical device of this kind is the electronic hearing aid. Another requirement of such devices is that the source of electricity be light in weight and of small size for ready portability. Conventionally, dry cells of the Leclanche type are presently in use for such applications, but although such cells satisfy very well the requirements as to size and weight, not only are they incapable of delivering constant voltage under the conditions of use, but their life is quite short.

In direct contrast to the Leclanche type of cell, the conventional air-depolarized cell comprising an air-permeable carbonaceous electrode, a zinc electrode and a caustic electrolyte is capable of delivering a relatively constant voltage and has a relatively long life, but such cells are relatively very large and heavy and are decidedly not readily portable. A factor contributing to the large size of the conventional air-depolarized cell is the large quantity of electrolyte required for the production of an ampere hour of electricity.

It is the principal object of this invention to provide an electrolyte for an air-depolarized cell which electrolyte is so constituted that only a small quantity is required as compared with that required of conventional electrolyte for such cells. More specifically, it is an object of the invention to provide a caustic electrolyte which makes possible the construction of a miniature air depolarized cell.

These objects are achieved by the invention which comprises an aqueous electrolyte containing sodium hydroxide and starch in certain critical proportions. Specifically, the electrolyte of the invention may contain 1000 grams of water, 275 to 450 grams of sodium hydroxide and 20 to 50 grams of starch. Desirably, for the protection of the zinc anode of a cell in which the electrolyte is used, the electrolyte also contains up to 125 grams of zinc oxide per 1000 grams of water. A preferred range of composition per 1000 grams of water is 300 to 360 grams of sodium hydroxide and 25 to 40 grams of starch. If zinc oxide is used, a suitable quantity is about 20 to 125 grams, and a generally preferred range is 50 to 100 grams of zinc oxide per 1000 grams of water. A typical composition in accordance with the invention is composed of 335 grams of sodium hydroxide, 90 grams of zinc oxide, and 30 grams of corn starch per 1000 grams of water. However other starches than corn starch may also be used, for example, wheat, potato, or rice starches, or the modified starches available commercially under various trade names such as "Vulca," "Amioca" and "Linit."

As indicated above, the proportions of sodium hydroxide and starch are critical in the electrolyte of the invention to the attainment of the desired properties. Table I below indicates the criticality of the concentration of sodium hydroxide to the service obtained from air depolarized cells. The data in the table were obtained in two series of tests in each of which several different groups of cells of the construction disclosed in the copending application of Paul A. Marsal and Russell P. Fox, Serial No. 52,018, filed September 30, 1948, were subjected to the American Standards Association Test for hearing aid "A" batteries. In this test the cells are discharged through a 20 ohm resistance for 12 continuous hours a day at 70° F. until the voltage of the cells drops to 0.9 volt, the total number of hours of discharge required to cause the voltage to drop to this value being considered the service life of the cell. In each of the two series of tests individual groups of cells differed from other groups primarily in the concentration of sodium hydroxide in the electrolyte. The two series of tests differed from each other as well in the weight of zinc in the anode of the cells. To afford a true basis of comparison between the two series, the results of the test are expressed in the table as a percentage of the maximum service obtained in each series. As will be shown below this comparison is justified by the non-variant characteristic of the electrolyte of the invention. In the first series, the maximum service (100%) was 94 hours, in the second, 120 hours.

Table I

| Concentration of NaOH gms./1000 gms. H$_2$O | Service per cent |
|---|---|
| SERIES 1 | |
| 256 | 38.4; 76.8. |
| 269 | 38.4; 38.4; 89.4. |
| 282 | 99; 89.4; 89.4. |
| 296 | 88.3; 89.4; 89.4. |
| 305 | 100; 98; 89.4. |
| 338 | 89.4; 95.8; 94.8. |
| SERIES 2 | |
| 326 | 99.2; 96.0; 96.0. |
| 351 | 97.5; 98.3; 100. |
| 450 | 99.2; 94.1; 100. |
| 463 | 80; 80; 80. |
| 478 | 50; 80; 90. |

It will be seen from the above table that if the concentration of sodium hydroxide is below 270 grams per 1000 grams of water, the service of the cell is not uniform and is generally poor. (The electrolyte of conventional air-depolarized carbon-alkali-zinc cells contains about 230 to 250 grams of sodium hydroxide per 1000 grams of water.) Similarly if the concentration exceeds about 450 grams per 1000 grams of water, service is not uniform and is generally poor. However, between these limits, the service is uniformly good.

The presence of starch in the electrolyte of the invention is also critical as will be shown by the data in Table II below. Although starch is conventionally added to electrolyte where it is desired that the electrolyte be immobilized, and although the starch in the electrolyte of the invention serves to immobilize it in conventional manner, the starch produces an even more important result and an unexpected one, as yet unexplained, in the electrolyte of the invention. It has been conclusively demonstrated by considerable experimental work that if starch is omitted from the electrolyte of the invention the desired characteristics are not attained. That is, air-depolarized cells made with an electrolyte containing the preferred concentrations of sodium hydroxide and zinc oxide but with no starch give poor service, while cells otherwise identical but having an electrolyte containing starch within the preferred range of proportions achieve the desired service.

Table II summarizes typical results of those tests. As in the tests reported in Table I, the cells tested were constructed in accordance with the Marsal and Fox application above referred to and were subjected to the standard hearing aid battery test above described. The electrolyte in each cell contained per 1000 grams of water about 330 grams of sodium hydroxide and 90 grams of zinc oxide. The electrolyte in the first three cells contained no starch. The electrolyte in the second group of three cells contained about 30 grams of corn starch per 1000 grams of water and was immobilized by the starch. The electrolyte of the third group of cells also contained the same proportion of starch but had been artificially liquefied to determine the effect of liquefaction of an originally immobilized electrolyte on service life.

*Table II*

| Cell Number | Hours to 0.9 volt |
| --- | --- |
| 1 | 24 |
| 2 | 24 |
| 3 | 24 |
| 4 | 107 |
| 5 | 107 |
| 6 | 107 |
| 7 | 107 |
| 8 | 107 |
| 9 | 107 |

It will be observed from these data that the service life of the first three cells was uniform, this being true because the electrolyte contained sodium hydroxide within the critical range above defined, but was relatively short. The remainder of the cells had uniformly long life whether or not the electrolyte was immobilized by the starch it contained. Thus the data establish that in the electrolyte of the invention starch is much more than a mere electrolyte-immobilizing agent and that the service life of a cell containing the electrolyte is not shortened by liquefaction of electrolyte.

Other experimental work has shown that the electrolyte of the invention when used in air-depolarized cells having an air-permeable carbonaceous electrode and a zinc electrode is non-variant. That is, its composition and the concentrations of its constituents do not change during discharge of the cell. The carbon electrode also is non-variant and the supply of atmospheric oxygen is inexhaustible. The principal practical result of the non-variant nature of the electrolyte and carbon electrode is that within practical limits the only limitation on the service life of a cell in which it is used is the weight of the zinc in the anode and the space available for the reaction product which is zinc oxide. For a given cell therefore all that need be done to increase its service life is to use a heavier zinc anode. This characteristic is unique in a primary cell. The data in Table III, derived in the same manner as the data in Tables I and II from tests of cells which differed from each other only in the weight of the zinc anode used, demonstrate this characteristic of the electrolyte of the invention.

*Table III*

| Zinc Weight Grams | Hours to 0.90 Volt | Average Hours Per Gram of Zinc |
| --- | --- | --- |
| 7.1 | 96, 96, 96, 100 | 13.6 |
| 8.8 | 012, 120, 120, 120, 124, 127 | 13.6 |
| 12.0 | 167, 167, 168, 173, 173, 173 | 13.1 |
| 15.6 | 192, 204, 204, 211, 214, 223 | 13.3 |

Although the presence of zinc oxide in the electrolyte of the invention is not essential to the attainment of the desired ends, zinc oxide is a useful and desirable addition serving its conventional function of improving the shelf storage of a cell containing the electrolyte by protecting the zinc electrode from undue chemical attack.

The electrolyte of the invention may be prepared in conventional manner, for instance utilizing the method described in United States Patent 1,610,310 for preparing a starch gel and adding the other constituents at any convenient time.

Although a range of concentration for sodium hydroxide is given herein which is entirely satisfactory from the standpoint of performance, in general it is preferred that the sodium hydroxide concentration be held as low as possible within this range for several reasons. The higher the concentration the poorer is the electrical conductivity and the higher the freezing point of the solution; also, because of the corrosive nature of aqueous solutions of sodium hydroxide, it is desirable to use lower concentrations, particularly when the electrolyte is to be used in cells for devices carried on the person.

The electrolyte of this invention makes possible the construction of air-depolarized cells which not only have the desired electrical characteristics of a substantially constant voltage for long periods but also are small in size, light in weight, and readily portable. Since the electrolyte is non-variant, only sufficient is required in a cell to maintain conductivity, to cover the active surfaces of the electrodes, and to provide space for the reception of by-products formed by solution of the anode during discharge of the cell. This is equivalent to about 0.6 cubic centimeter per ampere hour whereas in conventional air-depolarized carbon-alkali-zinc cells about 3 to 8 cubic centimeters of electrolyte per ampere hour are required.

So long as the critical proportions of sodium hydroxide and starch above defined are observed, the desired characteristics of the electrolyte are attained. It is possible, of course, to add to the electrolyte conventional materials which have a beneficial effect on the rate and uniformity of corrosion of zinc, and the addition of such materials is within the scope of the invention.

We claim:

1. An aqueous electrolyte for a primary galvanic cell, which electrolyte contains for 1000 grams of water 275 to 450 grams of sodium hydroxide, up to 125 grams of zinc oxide, and 20 to 50 grams of starch.

2. An aqueous electrolyte for a primary galvanic cell, which electrolyte contains for 1000 grams of water 275 to 450 grams of sodium hydroxide, 20 to 125 grams of zinc oxide, and 20 to 50 grams of starch.

3. An aqueous electrolyte for a primary galvanic cell, which electrolyte contains for 1000 grams of water 300 to 360 grams of sodium hydroxide, 20 to 125 grams of zinc oxide, and 20 to 50 grams of starch.

4. An aqueous electrolyte for a primary galvanic cell, which electrolyte contains for 1000 grams of water 300 to 360 grams of sodium hydroxide, up to 125 grams of zinc oxide, and 25 to 40 grams of starch.

5. An aqueous electrolyte for a primary galvanic cell, which electrolyte contains for 1000 grams of water 300 to 360 grams of sodium hydroxide, 50 to 100 grams of zinc oxide and 25 to 40 grams of starch.

6. An aqueous electrolyte for a primary galvanic cell composed substantially of 335 grams of sodium hydroxide, 90 grams of zinc oxide, and 30 grams of starch per 1000 grams of water.

7. An air-depolarized cell comprising an air-permeable carbon electrode, a zinc electrode, and a non-variant aqueous electrolyte containing for 1000 grams of water 275 to 450 grams of sodium hydroxide, up to 125 grams of zinc oxide, and 20 to 50 grams of starch.

8. An air-depolarized cell comprising an air-permeable carbon electrode, a zinc electrode, and a non-variant aqueous electrolyte containing for 1000 grams of water 275 to 450 grams of sodium hydroxide, 20 to 125 grams of zinc oxide, and 20 to 50 grams of starch.

9. An air-depolarized cell comprising an air-permeable carbon electrode, a zinc electrode, and a non-variant aqueous electrolyte containing for 1000 grams of water 300 to 360 grams of sodium hydroxide, up to 125 grams of zinc oxide, and 25 to 40 grams of starch.

10. An air-depolarized cell comprising an air-permeable carbon electrode, a zinc electrode, and a non-variant aqueous electrolyte containing for 1000 grams of water 300 to 360 grams of sodium hydroxide, 50 to 100 grams of zinc oxide and 25 to 40 grams of starch.

11. An air-depolarized cell comprising an air-permeable carbon electrode, a zinc electrode, and a non-variant aqueous electrolyte containing 335 grams of sodium hydroxide, 90 grams of zinc oxide, and 30 grams of starch per 1000 grams of water.

ERWIN A. SCHUMACHER.
PAUL S. BROOKS.

REFERENCES CITED

The following references are of record in the file of this patent:

UNITED STATES PATENTS

| Number | Name | Date |
|---|---|---|
| 1,137,226 | Manchester | Apr. 27, 1915 |
| 1,219,074 | Bronsted | Mar. 13, 1917 |
| 1,356,436 | Engle | Oct. 19, 1920 |
| 1,484,784 | Heise | Feb. 26, 1924 |
| 2,180,839 | Schumacher et al. | Nov. 21, 1939 |
| 2,221,106 | Portail | Nov. 12, 1940 |
| 2,422,045 | Ruben | June 10, 1947 |
| 2,463,565 | Ruben | Mar. 8, 1949 |

FOREIGN PATENTS

| Number | Country | Date |
|---|---|---|
| 16,471 | Great Britain | Nov. 22, 1915 |